C. B. F. TINGLEY.

Improvement in Wood Screw Machines.

No. 5,472. Reissued July 1, 1873.

Witnesses
E. H. Bates
D. D. Frame

Inventor
C. B. F. Tingley
Chipman & Emery Atty's

AM. PHOTO-LITHOGRAPHIC CO. N.Y. (OSBORNE'S PROCESS.)

UNITED STATES PATENT OFFICE.

CYRUS B. F. TINGLEY, OF PAWTUCKET, RHODE ISLAND, ASSIGNOR TO WILLIAM H. HASKELL.

IMPROVEMENT IN WOOD-SCREW MACHINES.

Specification forming part of Letters Patent No. 123,307, dated January 30, 1872; reissue No. 5,472, dated July 1, 1873; application filed June 2, 1873.

*To all whom it may concern:*

Be it known that I, CYRUS B. F. TINGLEY, of Pawtucket, in the county of Providence and State of Rhode Island, have invented a new and valuable Improvement in Screw-Cutting Machines; and I do hereby declare that the following is a full, clear, and exact description of the construction and operation of the same, reference being had to the annexed drawing making a part of this specification, and to the letters and figures of reference marked thereon.

Figure 1:
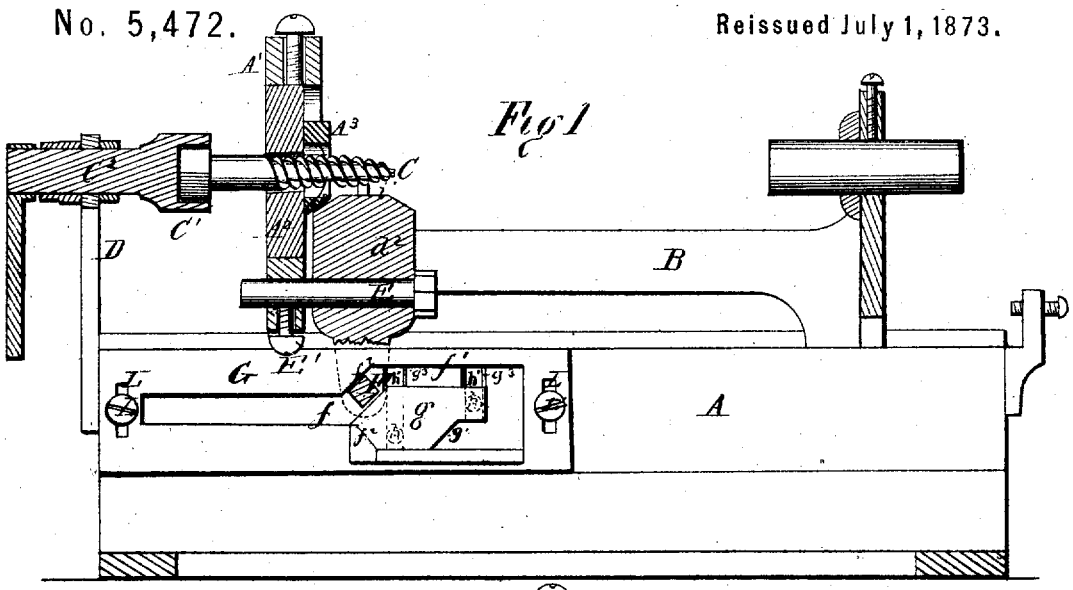
Figure 2:
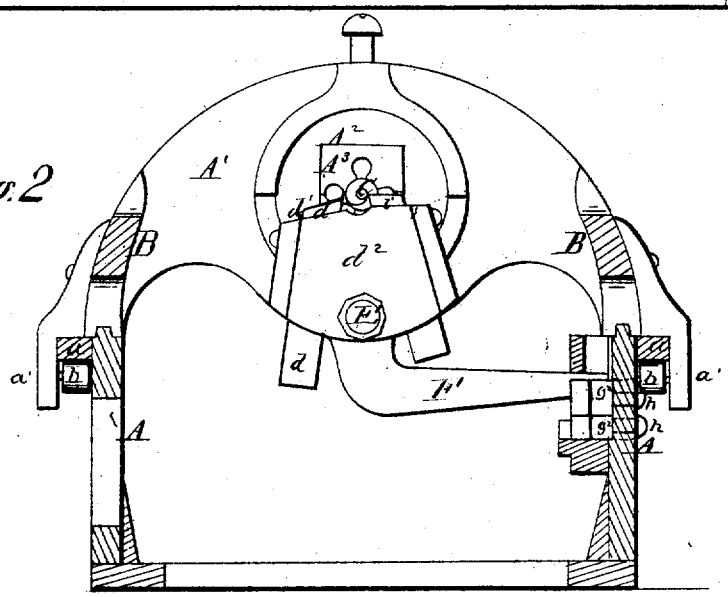
Figure 3:
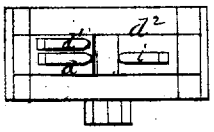

Figure 1 of the drawing is a representation of a vertical longitudinal section of my invention. Fig. 2 is a transverse vertical section. Fig. 3 is a top view of tool-block.

This invention has relation to machines for cutting wood screws; and it consists in the employment of a vibrating tool-holder carrying two sets of tools—one set for partly forming the convolutions of the thread upon the conical point of the screw, contemporaneously with the formation of the thread on the shank by dies, and the other set for finishing the thread upon the point while the screw is backing out from the threading-dies. It is important in screw-cutting machines which employ threading-dies, that more than one cut to form the thread upon the point should be made, as otherwise the tool would be required to enter to so great a depth in making a single cut that the screw would be liable to be sprung, and the thread would be imperfectly formed. By making one of the cuts during the backing-out movement of the screw, no time is lost in effecting the finishing cut. The invention further consists in a construction and novel arrangement of devices for controlling the movement of the tools for cutting the thread upon the points.

In the accompanying drawing illustrating this invention, A designates the frame or bed of a machine for cutting pointed wood screws, supporting a sliding carriage, B, having its sides grooved or channeled to fit the ridges or tracks on the top edges of the bed A along which said carriage travels. From the sides of the bed A project the horizontal flanges *a*, along which travel the brackets *a'*, which are secured to and project from the sides of the carriage B, and are provided with the friction-rollers *b*, designed to roll along the under surfaces of the flanges *a*. The forward end $A^1$ of the carriage B is constructed with a circular central opening, in which is secured a corresponding disk, $A^2$, having an aperture through its center, through which the screw-blank passes to the dies $A^3$ which cut the threads on the body thereof. The dies $A^3$ are secured to the inner face of the disk $A^2$, and may be of the ordinary kind used in cutting screw-threads on a cylindrical blank. The letter C shows a pointed screw, having its head secured to a mandrel-head, $C^1$, on the end of a horizontal rotary shaft, $C^2$, having its bearing on the elevated frame D, which is attached to one end of the bed A, and is driven by any suitable power. The head of the screw-blank is fitted in the mandrel-head, and, as the work progresses, the screw is gradually formed, as shown in Fig. 1. When the screw-blank is arranged as stated, the carriage B is moved forward until the end of the blank enters the dies $A^3$, when, by the turning of the shaft $C^2$, the screw works its own way through said dies, propelling the carriage B forward. After working its way, as described, through the dies $A^3$, the screw is brought into contact with the beveled pointing-tools *d* $d^1$, having their edges shaped to adapt them to the tapering form of the screw and the bevel of the screw-threads. These tools are fitted within recesses formed through a tool-block, $d^2$, which is pivoted to the ends $A^1$ of the carriage B by means of a horizontal bolt, E, made adjustable and regulated by means of the screw $E^1$. From the bottom of the tool-block projects an arm, F, which extends to one side of the bed A, as shown in Fig. 2, passing through a slot formed in a projecting plate, G. The slot *f* *f* is constructed with an enlargement, $f^1$, having two inclined or beveled shoulders, $f^2$. Within the enlarged chamber $f^1$ is arranged a movable cam-block, *g*, having its forward end beveled to a V-shape, and near its rear end a single beveled shoulder, $g^1$. From the inner face of this cam-block lugs $g^2$ project, and enter vertical grooves $g^3$ in the wall of the bed A, allowing said block a vertical movement. Screws $h$, which pass through slots $h'$, cut through the wall of the bed A into the grooves $g^3$, enter the lugs $g^2$, and hold the block in place. When a screw-blank is properly adjusted preparatory to the threads being cut on it, the end of the tool-block arm F lies at the back part of the block $g$, under its projecting end, and against its beveled shoulder $g^1$. When it is in this position the screw-blank is just about entering the dies $A^3$. The shaft $C^2$, being now rotated, the carriage B is moved forward until the end of the screw projects out, beyond the dies $A^3$, toward the pointing-tools, whereupon the end of the arm F, having moved along underneath the cam-block $g$, which it has raised, has reached the forward lower bevel of said block, above the lower beveled shoulder of the enlargement $f^1$. Now, as the work goes on, the arm F passes up said beveled shoulder, tilting, by such movement, the tool-block, gradually causing the pointing-tools to trim down the threads and screw-shaft to a point. The work of pointing, it will be observed, commences at the end of the screw, and, as it progresses thence in the proper curve or incline, the pointing-tools recede from the center of the screw until they reach a point on a line with the corresponding side of the dies $A^3$. Afterward the rotation of the shaft $C^2$ is reversed, causing the carriage B to recede and the arm F to rise to the upper bevel of the cam-block, which falls so as to leave a space above it. As the arm F rises it tilts the tool-block over until a finishing-tool, $i$, comes in contact with and moves along the screw toward its point, finishing and rendering the threads smooth and even. The finishing-tool $i$ is similar in shape to the pointing-tools, and is secured to the tool-block, its edge projecting directly opposite to the pointing-tools. The tool $d$ projects slightly beyond the cutting-edge of the tool $d^1$, following the latter in its work, but cutting deeper, so as to aid in giving the screw its proper tapering form and point. The finishing-tool $i$ serves to remove the surplus stock left by the tools $d$ $d^1$. If one finishing-tool is not enough for the purpose, others may be used. L represents slots in the ends of the plate G, through which pass screws L', securing said plate to the bed. By means of said slots the plate G is rendered adjustable.

I claim as my invention—

1. The combination, substantially as described, in a screw-cutting machine, of the threading-dies $A^3$ with a vibrating tool-holder, $d^2$, furnished with threading-tools $d$ $d^1$, and a finishing-tool or tools, $i$, when such tools are arranged to act alternately as the screw advances or retreats through the dies in cutting and dressing the thread upon the point, as herein set forth.

2. The automatic rising and falling cam $g$, in combination with the plate G, having the slot $f$ and the enlarged space $f^1$, for the purpose of guiding the tool-post of a machine for threading gimlet-pointed screws, substantially as specified.

3. In a screw-threading machine, the combination, with the plate or bracket G having the slot $f$ and beveled enlargement $f^1$, of the cam-block $g$, vibrating tool-holder, and arm F, substantially as specified.

CYRUS B. F. TINGLEY.

Witnesses:

BENJ. F. THURSTON,

SAMUEL AWES.